United States Patent
Murayama

(10) Patent No.: US 8,310,734 B2
(45) Date of Patent: Nov. 13, 2012

(54) IMAGE FORMING APPARATUS

(75) Inventor: Kentaro Murayama, Kasugai (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 534 days.

(21) Appl. No.: 12/567,037

(22) Filed: Sep. 25, 2009

(65) Prior Publication Data

US 2010/0079824 A1    Apr. 1, 2010

(30) Foreign Application Priority Data

Sep. 29, 2008  (JP) .................................. 2008-251834

(51) Int. Cl.
*H04N 1/04* (2006.01)
(52) U.S. Cl. .......... 358/474; 358/475; 358/482; 358/497
(58) Field of Classification Search .................. 358/474, 358/475, 482, 497, 498
See application file for complete search history.

(56) References Cited

U.S. PATENT DOCUMENTS

| | | | |
|---|---|---|---|
| 6,218,660 B1 | 4/2001 | Hada | |
| 6,295,435 B1 | 9/2001 | Shinohara et al. | |
| 7,715,770 B2 | 5/2010 | Kinoshita | |
| 7,986,907 B2 * | 7/2011 | Miyadera | 399/301 |
| 2006/0023272 A1 | 2/2006 | Tezuka | |
| 2007/0048031 A1* | 3/2007 | Kinoshita | 399/301 |
| 2008/0181634 A1 | 7/2008 | Kinoshita | |

FOREIGN PATENT DOCUMENTS

| | | |
|---|---|---|
| JP | 07-271265 | 10/1995 |
| JP | 11-143169 | 5/1999 |
| JP | 11-295037 | 10/1999 |
| JP | 2000-318221 | 11/2000 |
| JP | 2002-006580 | 1/2002 |
| JP | 2004-109682 | 4/2004 |
| JP | 2005-181788 | 7/2005 |
| JP | 2006-042002 A | 2/2006 |
| JP | 2006251686 | 9/2006 |
| JP | 2007-033529 | 2/2007 |
| JP | 2007-163732 | 6/2007 |
| JP | 2007-264302 | 10/2007 |
| JP | 2008096856 | 4/2008 |
| JP | 2008-180946 A | 8/2008 |

OTHER PUBLICATIONS

Notification for Reasons for Refusal for Japanese Application No. 2008-251834 mailed Mar. 10, 2011.
Notice of Reasons of Refusal corresponding to Japanese Patent Application No. 2008-251834 dated Aug. 17, 2010.
Notification of Reasons for Refusal for Japanese Patent Application No. 2008-251834 mailed Dec. 7, 2010.

* cited by examiner

*Primary Examiner* — Houshang Safaipour
(74) *Attorney, Agent, or Firm* — Banner & Witcoff, Ltd.

(57) ABSTRACT

An image forming apparatus includes: a forming unit configured to form a mark on a carrier; a light emitting unit configured to emit light toward a surface of the carrier; a light receiving unit configured to receive reflected light from the surface of the carrier and from the mark and configured to output a light reception signal corresponding to a amount of the received reflected light; a detecting unit configured to detect a position of the mark on the carrier on a basis of a signal wave contained in the light reception signal; and a modification unit configured to modify the detected position of the mark by a modification amount corresponding to a difference in a waveform of the signal wave corresponding to the mark so as to reduce an error between the detected position and an actual position.

15 Claims, 10 Drawing Sheets

FIG.8

|  | MARK TYPE (COLOR) | PROPORTIONALITY COEFFICIENT |
|---|---|---|
| FIRST DETECTION PATTERN MARK (50) | K | $\alpha K1$ |
|  | Y | $\alpha Y1$ |
| THIRD DETECTION PATTERN MARK (63) | M | $\alpha M1$ |
|  | C | $\alpha C1$ |
| SECOND DETECTION PATTERN MARK (62) | K | $\alpha K2$ |
|  | Y | $\alpha Y2$ |
|  | M | $\alpha M2$ |
|  | C | $\alpha C2$ |

IMAGE FORMING APPARATUS

CROSS REFERENCE TO RELATED APPLICATION

This application claims priority from Japanese Patent Application No. 2008-251834 filed on Sep. 29, 2008. The entire content of this priority application is incorporated herein by reference.

TECHNICAL FIELD

The present invention relates to an image forming apparatus.

BACKGROUND

A known image forming apparatus has a function to, for example, correct deviation in an image forming position on a sheet. Specifically, in the correction function, a pattern (such as a registration pattern) configured by a plurality of marks is formed on a belt. Next, on a basis of signal waves contained in a light reception signal from an optical sensor having a detection area on the belt, the positions of the marks corresponding to the signal waves are detected. On a basis of a result of the detection, the deviation in the image forming position is corrected.

However, a factors such as a response delay of the optical sensor to the time when the mark passes the detection area can cause errors between the mark positions detected based on the signal wave and respective actual position. This error can decrease accuracy in correcting the image forming position. Therefore, there is an art addressed to reduce the errors between the detected mark position and the actual position by stepwisely increasing and decreasing an amount of toner attached in each of the marks.

However, in the art, a process of increasing and decreasing the amount of toner attached in the mark is necessary, which is troublesome. Therefore, there is a need for another means. Furthermore, even where the above-described art is adopted, the errors between the detected mark position and the actual position can sometimes still be caused. Therefore, there is a need for further improvement.

SUMMARY

An image forming apparatus in accordance with the present invention includes: a forming unit configured to form a mark on a carrier; a light emitting unit configured to emit light toward a surface of the carrier; a light receiving unit configured to receive reflected light from the surface of the carrier and from the mark and configured to output a light reception signal corresponding to an amount of the received reflected light; a detecting unit configured to detect a position of the mark on the carrier on a basis of a signal wave contained in the light reception signal; and a modification unit configured to modify the detected position of the mark detected by a modification amount corresponding to a difference in a waveform of the signal wave corresponding to the mark so as to reduce an error between the detected position and an actual position.

BRIEF DESCRIPTION OF THE DRAWINGS

FIG. 8 is an illustration of a correspondence relation between mark types and proportionality coefficients;

DETAILED DESCRIPTION

<Illustrative Aspect>

An illustrative aspect in accordance with the present invention will be described with reference to drawings.

(Schematic Configuration of Printer)

Figure 1:
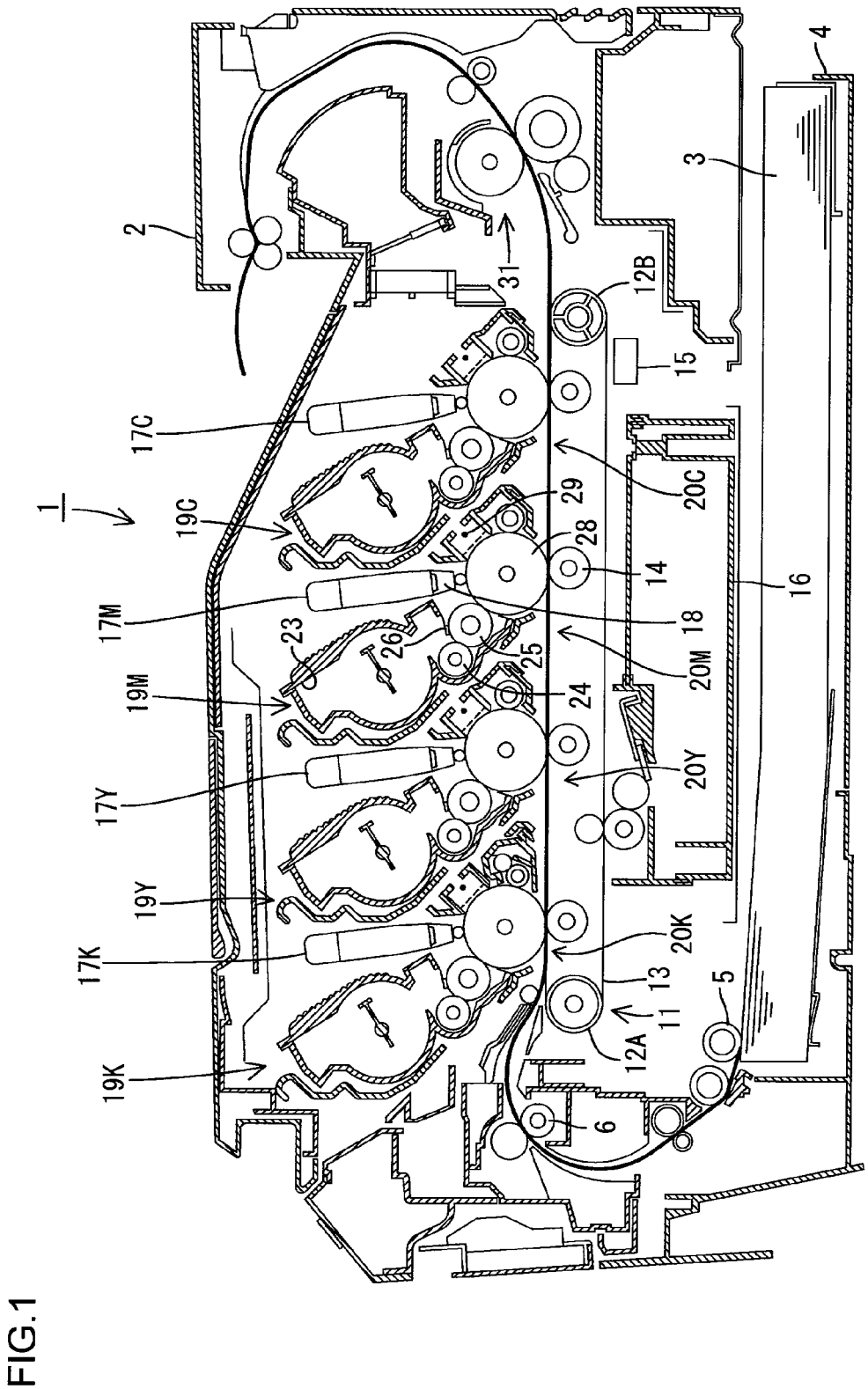
FIG. 1 is a side sectional view schematically illustrating a printer of an illustrative aspect in accordance with the present invention.

As illustrated in FIG. 1, a printer 1 (an illustration of an image forming apparatus) of this illustrative aspect is a color printer of a direct transfer type. The printer 1 can form a color image using toners in, for example, four colors (black K, yellow Y, magenta M, and cyan C). The leftward direction in FIG. 1 represents the frontward direction (the sub-sub-scanning direction; illustrated by a reference character F in each figure) of the printer 1, while the depthwise direction in the same figure represents the lateral direction (the main scanning direction) of the printer 1. Note that, hereinafter, where components and terms of the printer 1 are designated by color, they will bear reference characters having K, C, M, and Y (representing the black, cyan, magenta, and yellow colors, respectively) on the end. Note also that the black color is an illustration of an "achromatic color", while the yellow, magenta, and cyan colors are illustrations of "chromatic colors".

The printer 1 includes a casing 2. A sheet supply tray 4 is provided in a bottom portion of the casing 2 such that a plurality of sheets 3 (specifically paper sheets) can be stacked therein. A sheet supply roller 5 is provided above the front end of the sheet supply tray 4. As the sheet supply roller 5 rotates, a sheet 3 stacked uppermost in the sheet supply tray 4 is sent out toward a registration roller 6. The registration roller 6 corrects skew of the sheet 3 and then conveys the sheet 3 onto a belt unit 11.

The belt unit 11 includes two support rollers 12A, 12B and a loop belt 13 (an illustration of a "carrier") stretched between the support rollers 12A, 12B. The belt 13 is made of resin such as polycarbonate and has a mirror finished surface. The rear support roller 12B rotates and circulates the belt 13 so that the belt 13 backwardly conveys the sheet 3 carried thereon. Four transfer rollers 14 are provided at respective positions in the loop of the belt 13 so as to be opposed to photosensitive bodies 28 of four process units 19K-19C across the belt 13.

Furthermore, a pattern sensor 15 is disposed below the belt 13. The pattern sensor 15 can detect a mark on a surface of the belt 13. In addition, a cleaner 16 is provided below the belt unit 11. The cleaner 16 can collect toner, paper powder, etc. that are attached to the surface of the belt 13.

Four exposure units 17K, 17Y, 17M, 17C and the process units 19K, 19Y, 19M, 19C are arranged in tandem above the belt unit 11. The exposure units 17K, 17Y, 17M, 17C, the respective process units 19K, 19Y, 19M, 19C, and the respective transfer rollers 14 configure respective sets of image forming units 20 (illustrations of "forming units"). The printer 1 as a whole thus includes four image forming units 20K, 20Y, 20M, 20C each corresponding to respective colors (black, yellow, magenta, and cyan).

The exposure units 17K-17C include respective LED heads 18. Each of the LED heads 18 has a plurality of LEDs arranged in line. Light emission from the exposure units 17K-17C is controlled on a basis of a forming image data so that the surfaces of the respective opposing photosensitive bodies 28 are exposed to the light emitted from the LED heads 18 line-by-line.

Each of the process units 19K-19C includes a toner chamber 23 and, below the toner chamber 23, a supply roller 24, a developer roller 25, and a layer-thickness regulating blade 26, etc. The toner chambers 23 store toner (developer) in the respective colors. The toner released from the toner chambers 23 is supplied to the respective developer rollers 25 by rotation of the respective supply rollers 24. Then, the toner is positively charged by friction between the supply rollers 24 and the developer rollers 25. Thereafter, as the developer rollers 25 rotate, the toner enters the gaps between the layer-thickness regulating blades 26 and the respective developer rollers 25. The toner is still more sufficiently charged by friction there and is carried as even and thin layers on the developer rollers 25.

The process units 19K-19C further includes the respective photosensitive bodies 28 and respective scorotron chargers 29. The surfaces of the photosensitive bodies 28 are covered with photosensitive layers having positive charge polarity. At a time of image formation, as the photosensitive bodies 28 rotate, the surfaces of the photosensitive bodies 28 are uniformly and positively charged by the chargers 29. Then, these positively charged portions are exposed by the exposure units 17K-17C. Thus, electrostatic latent images are formed on the surfaces of the photosensitive bodies 28.

Next, the toner carried on the developer rollers 25 and positively charged is supplied to the respective electrostatic latent images on the surfaces of the photosensitive bodies 28. The electrostatic latent images are thus visualized. Thereafter, while the sheet 3 passes each of transfer positions between the photosensitive bodies 28 and the transfer rollers 14, the toner images carried on the surfaces of the photosensitive bodies 28 are sequentially transferred onto the sheet 3 under the negative transfer voltage applied to the transfer rollers 14. The sheet 3 with the transferred toner images is then conveyed to a fixing unit 31. The toner images are fixed there. Thereafter, the sheet 3 is upwardly conveyed and is ejected onto the top of the casing 2.

(Electrical Configuration of Printer)

Figure 2:
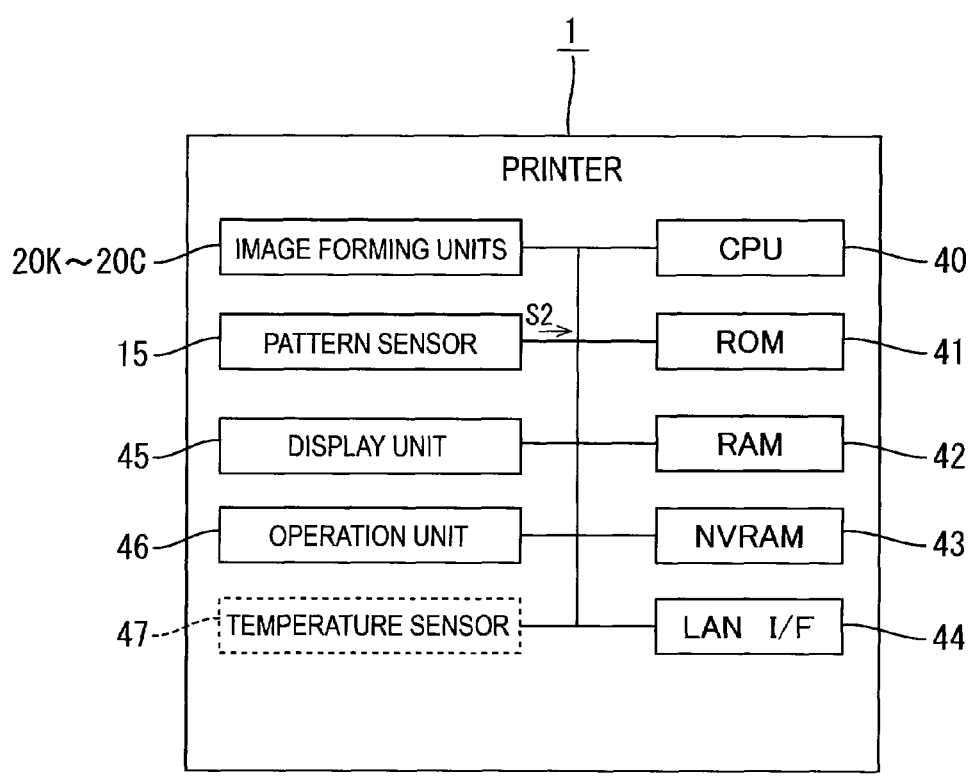
FIG. 2 is a block diagram schematically illustrating an electrical configuration of the printer.

As illustrated in FIG. 2, the printer 1 includes a CPU 40, a ROM 41, a RAM 42, an NVRAM (non-volatile random access memory) 43, and a network interface 44. These members are connected to the image forming units 20K-20C, the pattern sensor 15, a display unit 45, an operation unit 46, etc.

Programs for the printer 1 to execute various kinds of processes such as a positional deviation correction process (described below) are stored in the ROM 41. The CPU 40 reads out the programs from the ROM 41 and, according to the programs, controls each component while storing the result of the processes in the RAM 42 or in the NVRAM 43. The network interface 44 is connected to an external computer (not illustrated) via a communication line such that mutual data communication is available.

The display unit 45 includes a liquid crystal display, a lamp, etc. to display various kinds of setting windows, operating states of the printer 1, etc. The operation unit 46 includes a plurality of buttons that the user can operate to input various kinds of information.

(Pattern Detection Sensor)

Figure 3:
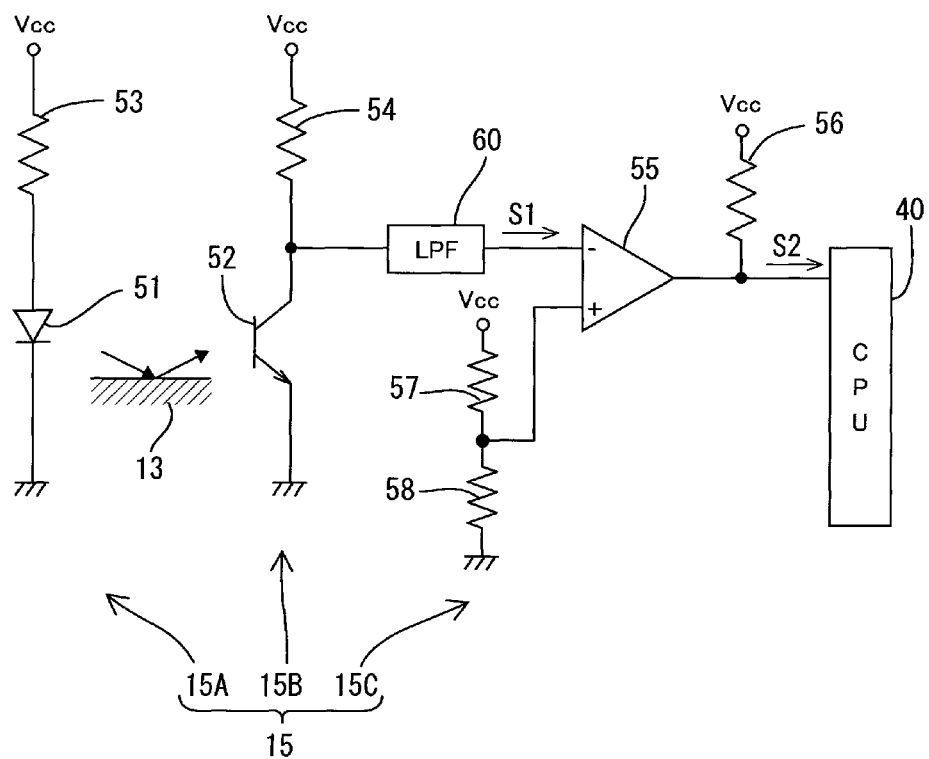
FIG. 3 is an illustration of a circuit diagram of a pattern detection sensor.

As illustrated in FIG. 3, the pattern sensor 15 includes a light emitting circuit 15A (an illustration of a "light emitting unit"), a light receiving circuit 15B (an illustration of a "light receiving unit"), and a comparison circuit 15C. The light emitting circuit 15A has a light emitting element 51 that emits light toward the belt 13. The light receiving circuit 15B has a light receiving element 52 that receives reflected light from the belt 13. The comparison circuit 15C compares the output of the light receiving circuit 15B with a mark detection threshold VM.

The light emitting element 51 of the light emitting circuit 15A is configured by an LED. The cathode of the light emitting element 51 is grounded, while the anode is connected to a power line Vcc. In correction processes described below, a constant voltage is applied to the light emitting circuit 15A under an instruction of the CPU 40 so that the light emitting element 51 emits a constant amount of light.

The light receiving element 52 of the light receiving circuit 15B is configured by a phototransistor. The emitter of the light receiving element 52 is grounded, while the collector is connected to the power line Vcc via a resistor 54. Furthermore, a light reception signal S1 at a level (a voltage value) corresponding to the amount of the received reflected light from the belt 13 is provided to the comparison circuit 15C via the low-pass filter 60. In this illustrative aspect, the light receiving element 52 outputs the light reception signal S1 at a lower level as the amount of received light is larger. In addition, the low-pass filter 60 is, for example, a CR or LC low-pass filter. The low-pass filter 60 reduces a spike noise etc. contained in the light reception signal S1.

The comparison circuit 15C includes an OP-amp (operational amplifier) 55 and resistors 56, 57, 58. The inverting input of the OP-amp 55 is connected to the output of the low-pass filter 60. The output of the OP-amp 55 is connected to the power line Vcc via a pull-up resistor 56 and also to the CPU 40. The non-inverting input of the OP-amp 55 is provided with a divided voltage of a voltage divider circuit configured by the resistors 57, 58 as the mark detection threshold VM. Thus, the OP-amp 55 compares the level of the light reception signal S1 inputted to the inverting input with the mark detection threshold VM. Then, the OP-amp 55 outputs a binary signal S2 that corresponds to the comparison result.

(Process of Correcting Deviation in Image Forming Positions and Detection Patterns)

The printer 1 executes "a color-deviation correction process" and "a line-interval correction process". The "color-deviation correction process" is a process of correcting deviation between the different color image forming positions on the sheet 3. The "line-interval correction process" is a process of correcting deviation in intervals between the image lines (line forming positions) in a same color image.

(1) Color-Deviation Correction Process

The color deviation correction process includes "a first color-deviation correction process" of correcting deviation in the sub-scanning direction and "a second color-deviation correction" of correcting deviation in the main scanning direction. Note that, in this illustrative aspect, the black color is designated as a reference color; the yellow, magenta, and cyan colors are designated as adjusted colors; and the adjusted-color image forming positions are adjusted relatively to the reference-color image forming positions.

A. First Color-Deviation Correction Process

Figure 4:
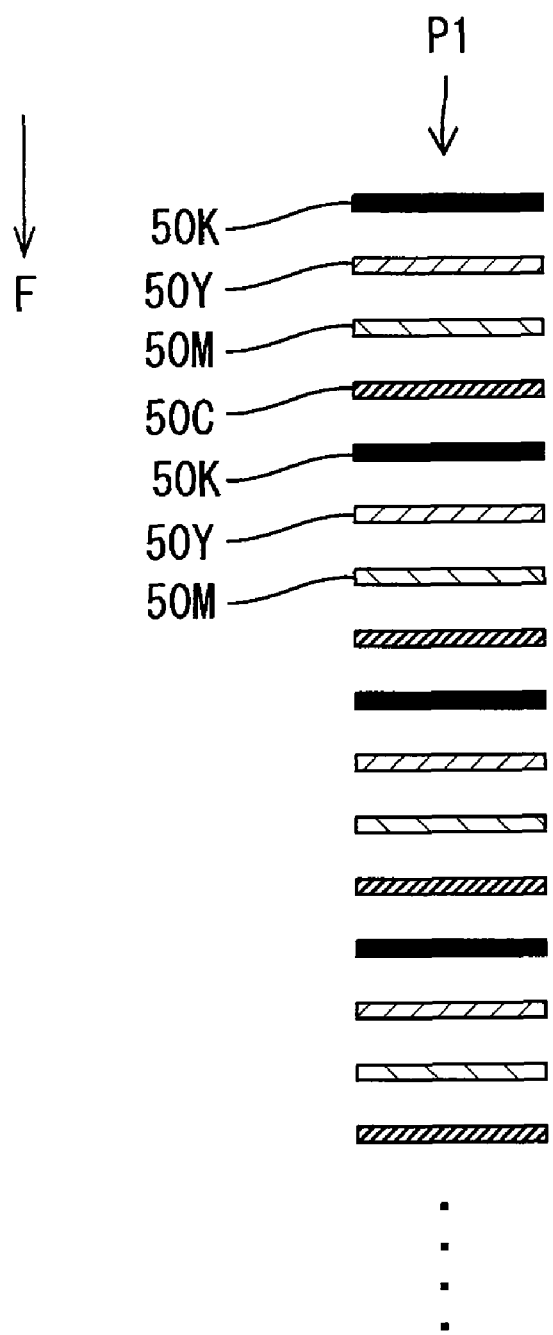
FIG. 4 is an illustration of a first-detection pattern.

In the first color-deviation correction process, a first detection pattern P1 illustrated in FIG. 4 is used. The first detection pattern P1 has marks 50 in colors. Each of the marks 50 is elongated in the main scanning direction and is narrow. Each four marks 50K-50C are arranged in the order of black, yellow, magenta, and cyan and configure a mark set. A plurality of mark sets of the marks 50 are arranged on the belt 13 at intervals in the sub-scanning direction and form the first detection pattern P1. Note that the marks 50 are same in shape and size.

Where the adjusted-color image forming positions are deviated in the sub-scanning direction relatively to the reference-color image forming positions, the relative distances between the positions of the adjusted-color marks 50Y-50C and the positions of the reference-color marks 50K are changed. Accordingly, with respect to each mark set, the relative differences between the positions of the adjusted-color marks 50Y-50C and the position of the reference color mark 50K are calculated. On a basis of a calculation result with respect to every mark set, with respect to each adjusted color, an average value of the relative distances is calculated. Then, differences between the average values of the relative distances and respective predetermined ideal values are determined as sub-scanning deviation amounts in the image forming positions relative to the reference color. The sub-scanning deviation amounts are stored in, for example, the NVRAM 43. Thus, at a time of a normal image forming process based on an image forming instruction from, for example, the exterior computer, the timings to expose the photosensitive bodies 28 by the exposure units 17Y-17C corresponding to the respective adjusted colors are adjusted so as to compensate the sub-scanning deviation amounts.

B. Second Color-Deviation Correction Process

Figure 5:
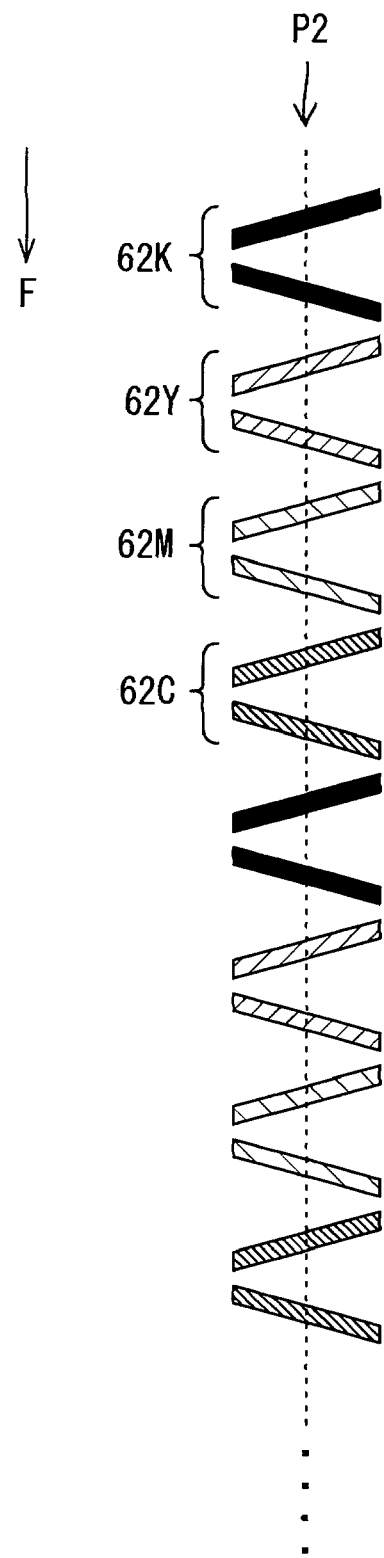
FIG. 5 is an illustration of a second-detection pattern.

In the second color-deviation correction process, a second detection pattern P2 illustrated in FIG. 5 is used. The second detection pattern P2 has mark pairs 62 in colors. Each of the mark pairs 62 is configured by two marks 61, 61 that form angles different from each other with the main scanning direction. Four mark pairs 62K-62C are arranged in the order of black, yellow, magenta, and cyan and configure a mark pair set. A plurality of mark pairs 62 are disposed on the belt 13 at intervals in the sub-scanning direction and form the second detection pattern P2. Note that, in this illustrative aspect, the mark pairs 62 are same in shape and size; further, two marks 61, 61 configuring each mark pair 62 have line symmetry with respect to respective straight lines along the main scanning direction. Each of the distances between the two marks 61, 61 will hereinafter be referred to as a "mark distance".

Where the adjusted-color image forming positions are deviated in the main scanning direction relatively to the reference-color image forming position, the reference-color mark pairs 62K and the adjusted-color mark pairs 62Y-62C differ in the mark distances on a straight line along the sub-scanning direction. The straight line passes an area (the detection area) exposed with the light from the light emitting circuit 15A on the belt 13. In FIG. 5, the straight line is illustrated by a dotted line. Accordingly, differences in the mark distances between the adjusted-color mark pairs 62Y-62C and the reference-color mark pair 62K are calculated with respect to each mark pair set. On a basis of a calculation result with respect to every mark pair set, with respect to each adjusted color, an average of the differences in the mark distances is calculated. Then, the averages of the differences in the mark distances are determined as main scanning deviation amounts of the image forming positions relative to the reference color, and the main scanning deviation amounts are stored in, for example, the NVRAM 43. Thus, at the time of the normal image forming process, the timings to expose the respective photosensitive bodies 28 by the exposure units 17Y-17C corresponding to the respective adjusted colors are adjusted so as to compensate the respective main scanning deviation amounts.

(2) Line-Interval Correction Process

Figure 6:
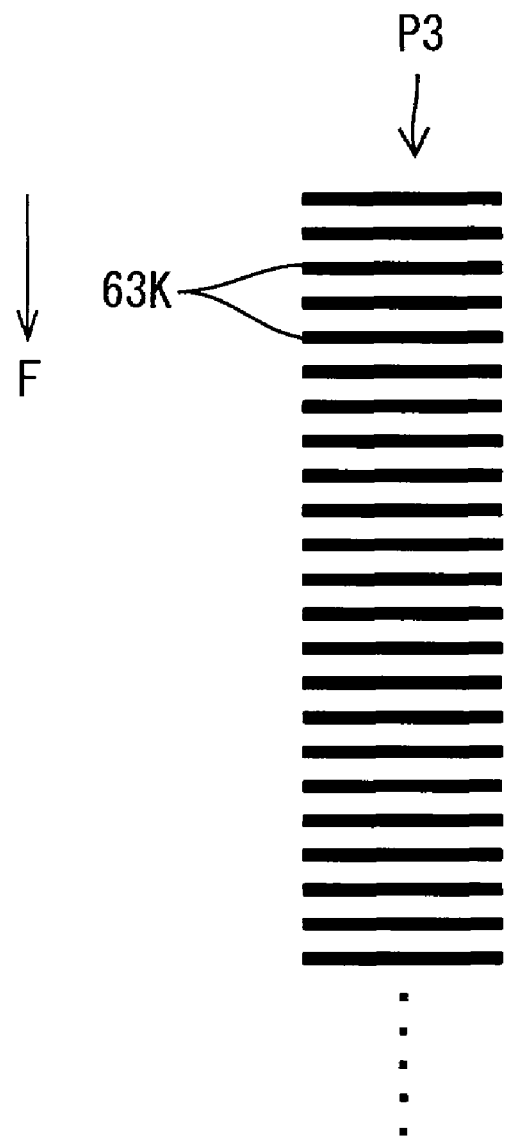
FIG. 6 is an illustration of a third-detection pattern.

In the line-interval correction process, third detection patterns P3 illustrated in FIG. 6 are used. The third detection patterns P3 are prepared by color (black, yellow, magenta, and cyan). Each of the detection patterns P3 is formed by a plurality of marks 63 in a same color. Each of the plurality of marks 63 is elongated in the main scanning direction and is narrow. The plurality of marks 63 are arranged on the belt 13 at intervals in the sub-scanning direction. When a line interval correction is performed with respect to, for example, a black image, the third detection pattern P3 configured by only the black marks 63K is formed on the belt 13. On a basis of the signal waves of the light reception signal S1 from the pattern sensor 15, the positional relation between the marks 63K is detected. From the detected positional relation between the detected marks 63K, variation in the line interval due to cyclic fluctuation in the rotation speed of, for example, the photosensitive bodies 28 or the belt 13 can be grasped. Therefore, the deviation amounts (line deviation amounts) from ideal positions when the line intervals come to the respective ideal intervals are calculated with respect to the position of each mark 63, and the line deviation amounts are stored in, for example, the NVRAM 43. Thus, at the time of the normal image forming process, the timings to expose the photosensitive bodies 28 by the exposure units 17K-17C corresponding to the respective colors are adjusted so as to compensate the line deviation amounts.

(Error Between Detected Mark Position and Actual Mark Position)

As described above, in the processes of correcting the image forming positions, the positions of the marks 50, 61, 63 have to be detected. Here, the mark position is determined on a basis of times when a signal wave (that is contained in the light reception signal S1 and corresponds to the mark) crosses the mark detection threshold VM. In this illustrative aspect, each position (on the belt 13) that corresponds to a center time point between two times when the signal wave crosses the mark detection threshold VM is detected illustratively as the mark position.

However, various kinds of factors can cause an error between the detected mark position based on the light reception signal S1 from the pattern sensor 15 and the actual mark position on the belt 13. Furthermore, the error amount can differ depending on the difference in the waveform (specifically in the slopes) of the signal wave of the mark. This can prevent accurate calculation of the deviation amounts in the correction processes and can cause lower correction accuracy. Note that, in this illustrative aspect, the "slope" can be interpreted broadly so as to express a degree of increase or decrease in the signal wave. For example, where the signal wave is a triangular wave or a trapezoidal wave, the "slope" expresses the inclination of the line; or, where the signal wave is a pulse wave, a rise time (a delay time) or a fall time of the pulse wave is also included within the "slope".

It is conceivable that one of main factors of this is output delay by the low-pass filter 60. That is, as described above, the light reception signal S1 is provided from the light receiving element 52 to the comparison circuit 15C via the low-pass filter 60. Accordingly, the filtered (noise reduced) light reception signal S1 delays relatively to the original (noise unreduced) light reception signal S1 and corresponding to the time constant (CR) of the low-pass filter. Then, the delay amount (the delay time) differs depending on the slopes and the wave height value of the signal wave contained in the original light reception signal S1. The difference appears as the difference in the waveform (specifically in the slope) of the signal wave of the filtered light reception signal S1.

Here, the slope of the signal wave of the filtered light reception signal S1 can differ specifically depending on factors (1) and (2), which are as follows:

(1) Shape, Size, and Color of Mark

The slope of the signal wave of the filtered light reception signal S1 can differ if the marks 50, 61, 63 differ in one of shape, size, and color.

First, a case where the marks are same in shape and size while differ only in color will be described with reference to FIG. 7. Note that, as described above, the signal wave (the light reception signal S1) is at a lower level as the amount of light received at the light receiving circuit 15B is larger. That is, the level of the amount of received light is higher as the signal S1 comes downward in FIG. 7. In addition, regarding the light reflectance, the belt 13 has the highest light reflectance, the adjusted-color marks are the next, and the reference-color marks are the lowest.

Because the black mark 50K and the yellow mark 50Y differ comparatively largely in light reflectance, they differ in the waveforms of the signal waves or, specifically, in the rising and the falling slopes. Accordingly, the signal wave corresponding to the black mark 50K and the signal wave corresponding to the yellow mark differ in the delay amounts (the slopes) due to the low-pass filter 60; following this, they differ in the error amounts between the detected mark positions and the actual positions.

Specifically, referring to the black mark 50K, a center time point T3 between a rising start stage T1 and a falling start stage T5 of the signal wave (the solid-line waves in FIG. 7) corresponds to a center point OK (the actual position) of the black mark 50K in the sub-scanning direction. However, a time point T2 where the signal wave crosses the mark detection threshold VM during the rise time delays from the rising start stage T1. On the other hand, a time point T6 where the signal wave crosses the mark detection threshold VM during the fall time delays only slightly from the falling start stage T5. Accordingly, a center time point T4 between the two time points T2, T6 delays from the center time point T3, and an error by the amount for the delay is caused between a detected position OK' of the black mark 50K corresponding to the center time point T4 and the actual position OK of the black mark 50K. The error amount is denoted by Z1.

On the other hand, referring to the yellow mark 50Y, a center time point T9 between a rising start stage T7 and a falling start stage T11 of the signal wave corresponds to a center point (the actual position) OY of the yellow mark 50Y in the sub-scanning direction. However, a time point T8 where the signal wave crosses the mark detection threshold VM during the rise time delays from the rising start stage T7. On the other hand, a time point T12 where the signal wave crosses the mark detection threshold VM during the fall time delays only slightly from the falling start stage T11. Accordingly, a center time point T10 between the two time points T8, T12 delays from the center time point T9, and an error by the amount for the delay is caused between a detected position OY' of the yellow mark 50Y corresponding to the center time point T10 and the actual position OY of the yellow mark 50K. The error amount is denoted by Z2.

Figure 7:
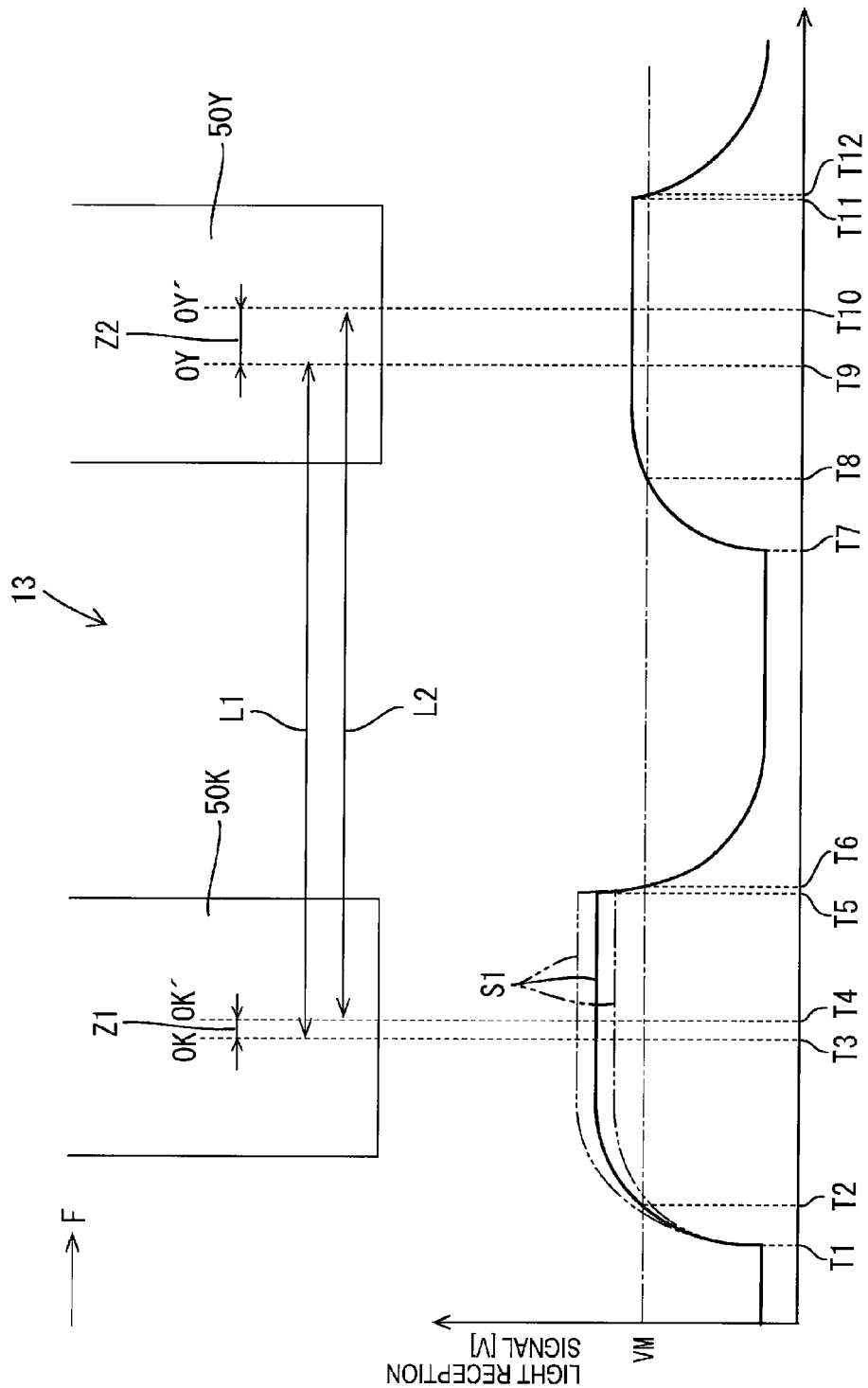
FIG. 7 is an illustration of a relation between positions of a black mark and a yellow mark and signal waves of a filtered light reception signal.

Then, as understood from FIG. 7, while the signal wave corresponding to the black mark 50K and the signal wave corresponding to the yellow mark 50Y largely differ in the rise slopes when crossing the mark detection threshold VM (the delay amounts from the rising start stages T1, T7, respectively), they are substantially same in the fall slope when crossing the mark detection threshold VM (the delay amounts from the falling start stage T5, T11). Accordingly, while the distance between the position of the black mark 50K and the position of the yellow mark 50Y has to be calculated as L1, the distance cannot avoid to be calculated as L2 (>L1) that includes the difference in the delay amounts (=Z2−Z1). Note that, in a case where the mark detection threshold VM is set at a still lower level, on the contrary to FIG. 7, the signal wave corresponding to the black mark 50K and the signal wave corresponding to the yellow mark 50Y are substantially same in the rise slope (the delay amount) when crossing the mark detection threshold VM, while they largely differ in the fall slopes when crossing the mark detection threshold VM (the delay amounts).

Furthermore, for example, the marks 50K, 63K of the detection patterns P1, P3 and the marks 61 of the mark pair 62K of the detection pattern P2 are same in mark color while differ at least in shape. Specifically, they differ from each other in the inclining directions with respect to the moving direction of the belt 13. Accordingly, likewise, the marks 50K, 63K and the marks 61 differ in the slopes in the respectively corresponding signal waves.

As described above, the signal waves of the filtered light reception signal S1 can differ if the marks 50, 61, 63 differ in one of shape, size, and color. The marks 50, 61, 63 sorted by a difference in one of shape, size, and color are hereinafter referred to as "mark type". For example, the marks that are same in all of shape, size, and color are considered to be same in the mark type, while the marks that differ from each other in at least one of shape, size, and color are considered to be different in the mark type.

(2) Mark Density etc.

Even if the mark type is same, the slopes of the signal waves of the filtered light reception signal S1 can sometimes differ. It is conceivable that its main factors are variation in mark density, variation in amount of light emitted from the light emitting circuit 15A, variation in light sensitivity of the light receiving circuit 15B, etc. For example, though it is suitable and ideal for the image forming units 20 to form the marks in the respective colors constantly at respective same densities in view of maintaining accuracy in the correction processes, it is difficult in practice. For example, the marks can differ in density depending on environmental difference in every forming time period; further, even if the forming time period is same, they can differ in density due to errors in transfer etc. Then, where they differ in density, they differ in the slopes of the signal waves as illustrated by two-dotted chain lines in FIG. 7. Thus, the accuracy in detecting the mark positions and, by extension, the accuracy in the correction processes can decrease.

(Mark Type and Modification Amount)

As described above, where the mark types differ, the slopes (the delay time) of the signal waves contained in the light reception signal S1 differ, and, corresponding to the difference, the error amount between the detected mark position and the actual position (that hereinafter may be referred to simply as the "error amount") differs. Accordingly, a modification amount for compensating the error amount should be set with respect to each mark type.

Furthermore, because even the signal waves of the same mark type differ in the slopes depending on the density etc., the modification amounts by mark type should be changed corresponding to the slopes of the signal waves. Note that, in this illustrative aspect, the modification amounts are changed corresponding to not the slopes of the signal waves but the wave widths (the time differences between two time points where the respective signal waves cross the mark detection threshold VM). As understood from the solid line and the two-dotted chain lines in FIG. 7, the wave width is larger as the slope of the signal wave is larger (as the delay time is less), while the wave width is smaller as the slope is smaller (as the delay time is greater). Accordingly, the difference in the slopes due to density etc. can be determined depending on the difference in the wave widths. That is, it can be conceivable that a correlation can be applied between the error amounts, the slopes, and the wave widths. Accordingly, the modification amounts can be changed corresponding to the difference in the wave widths.

Specifically, with respect to each of the marks of the same type, while, for example, changing the density of the marks, the correspondence relation between 'the error amounts between the actual mark positions and the detected mark positions' and 'the wave widths of the signal wave' is found by, for example, experiments. Then, the difference in the wave widths of the signal waves of the light reception signal S1 is determined, an error amount corresponding to the determination result is extracted from the correspondence relation, and the modification amount is changed so as to compensate the error amount.

Furthermore, in this illustrative aspect, considering that a proportional relation can be applied between the wave widths of the signal waves and the modification amounts, proportionality coefficients α by mark type (for example, a table of correspondence relation between the mark types and the proportionality coefficients) as illustrated in FIG. 8 are stored in the NVRAM 43 as an illustration of a memory. For example, the modification amount with respect to the black mark 50K of the first detection pattern P1 can be calculated as [a proportionality coefficient αK1]*[a wave width of the signal wave corresponding to the black mark 50K].

Note that, in this illustrative aspect, as the marks 50 of the first detection pattern P1 and the marks 63 of the third detection patterns P3 are same in shape and size, these marks are considered to belong to a same mark type, and the same proportionality coefficient is applied thereto. On the other hand, as the two marks 61, 61 that configure the mark pair 62 of the second detection pattern P2 differ in shape while have line symmetry with respect to a straight line along the main scanning direction, it is conceivable that the slopes and the wave width of the signal waves corresponding to these two marks 61, 61 are same. Accordingly, the marks 61, 61 are considered to belong to a same mark type, and a same proportionality coefficient is applied thereto.

Note that, in this illustrative aspect, as described above, the CPU 40 receives not the light reception signal S1 as an analogue signal but the binary signal S2. Accordingly, though the CPU 40 cannot grasp the slopes of the signal waves, the CPU 40 can grasp the wave widths of the signal waves from the pulse widths of the binary signal S2. Therefore, the manner of changing the modification amounts on the basis of the wave widths as described above is useful specifically in the configuration of this illustrative aspect.

(Correction Process)

The above-described correction processes are executed when a predetermined condition is met, e.g. right after the printer 1 is powered on, when a predetermined time has elapsed after execution of a previous correction process, when image formation is performed for a predetermined number of sheets 3, etc.

(1) Color-Deviation Correction Process

Now, referring to FIG. 9, the color-deviation correction process will be described.

Hereinafter, the first color-deviation correction process will be illustrated. First, in S10 in FIG. 9, the CPU 40 provides a data for forming the first detection pattern P1 (an illustration of "information on a process of forming the marks") stored in, for example, the NVRAM 43 to the image forming units 20 and controls the image forming units 20 to start the operation to form the first detection pattern P1 on the belt 13. Then, in S20, using a predetermined capture start time point as the basis, the CPU 40 starts to capture the binary signal S2 from the pattern sensor 15. Furthermore, the CPU 40 detects the positions of the marks 50 on a basis of rise edges and fall edges of the pulse waves of the binary signal (pulse signal) S2. The CPU 40 functions as a "detecting unit" then.

In S30, on the basis of the binary signal S2, the CPU 40 recognizes which mark type the marks 50 corresponding to the respective pulse waves (the signal waves of the light reception signal S1) belong to. Specifically, on the basis of the data for forming the first detection pattern P1, the CPU 40 grasps which color the marks 50 in respective orders from the head of the first detection pattern P1 have (which mark type the marks 50 belong to). Furthermore, the CPU 40 decides the orders of the pulse waves contained in the binary signal S2 from the capture start time point. Then, the CPU 40 takes these pulse waves as corresponding to the marks 50 in the same order and identifies the mark types by the colors of the marks 50. The CPU 40 functions as a "recognizing unit" then.

Furthermore, the CPU 40 executes also a distinguishing process as follows in the above-described recognizing process. In the distinguishing process, on a basis of the pulse widths of the pulse waves, the CPU 40 distinguishes whether the pulse waves are the ones that correspond to the chromatic color marks 50 or the ones that correspond to the achromatic color marks 50. As described above, the pulse waves correspond to the wave widths of the signal waves of the light reception signal S1, and the wave widths differ specifically depending on whether the color of the marks 50 are chromatic or achromatic. This is because these colors differ specifically greatly in light reflectance. Therefore, the distinguishing process is operable on the basis of the pulse widths. The CPU 40 functions as a "distinguishing unit" then.

Then, with respect to each pulse wave, the CPU 40 compares the recognition result based on the data for forming the first detection pattern P1 and the distinction result by the distinguishing process. For example, waste, dust, etc. are sometimes attached onto the belt 13 and cause noise waves that are mixed in the light reception signal S1 and do not correspond to any mark. In this case, the two results are inconsistent: for example, the recognition result with respect to a pulse wave indicates that the color is achromatic, while the distinction result indicates that the color is chromatic. Accordingly, with this inconsistency, the CPU 40 executes, for example, an error handling. In the error handling, the CPU 40 indicates, for example, an error message etc. in the display unit 45, or lights a LED according to a predetermined pattern, or outputs an error signal to external equipment.

In S40, with respect to each of the mark types recognized in the recognizing process, the CPU 40 calculates an average of the wave widths of a pulse wave group belonging to the mark type. Next, in S50, with respect to each of the mark types, the CPU 40 calculates the modification amount for modifying the errors between the detected positions of the marks 50 detected in the above S20 and the actual positions. Specifically, with respect to each of the mark types, the CPU 40 extracts the proportionality coefficient α corresponding to the mark type from the table of correspondence relation between the mark types and the proportionality coefficients. Next, the CPU 40 calculates the modification amount by multiplying the extracted proportionality coefficient α by the average of the wave widths. That is, the detected positions of the marks 50 belonging to the same mark type are modified with a common modification amount based on the average of their wave widths. With this, the color-deviation correction can be performed by the simpler process in comparison with a configuration where the modification amount is separately changed by mark. The CPU 40 functions as a "modifying unit" then.

In the case illustrated in FIG. 7, the detected position of the black mark 50K is modified from the position OK' substantially to the actual position OK on a basis of the modification amount (=[αK1]*[the average of the wave widths of the black mark 50K group]); and the detected position of the yellow mark 50Y is modified from the position OY' substantially to the actual position OY on a basis of the modification amount (=[αY1]*[the average of the wave widths of the yellow mark 50Y group]).

In S60, on a basis of the detected and modified mark positions and with respect to each of the mark sets, the CPU 40 calculates the relative distances between the reference color mark 50K and the adjusted color marks 50Y-50C. The relative distances are modified to proper distances between the actual positions of the marks 50 by the modification of the detected mark positions. For example, in the case illustrated in FIG. 7, the relative distance between the two marks 50K, 50Y is modified from the distance L2 to the proper distance L1. The CPU 40 calculates the averages of the relative distances in every mark set, updates the storage content in the NVRAM 43 by rewriting the sub-scanning deviation amounts corresponding to the averages, and terminates the present correction process. Thus, the errors between the detected positions of the marks 50 and the respective actual positions can be reduced, and the color-deviation correction can be performed with higher accuracy. The CPU 40 functions as a "first correcting unit" then.

(2) Line-Interval Correction Process

Next, the line-interval correction process will be described with reference to FIG. 10.

Figure 10:
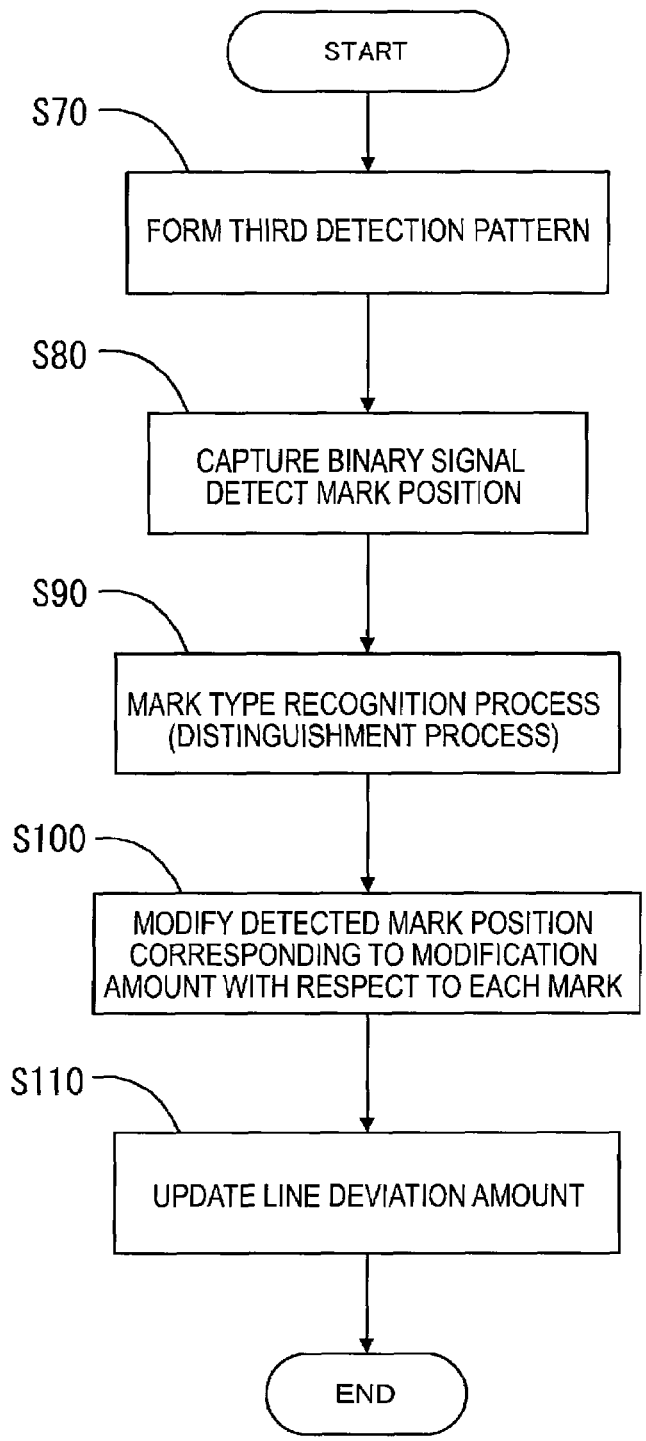
FIG. 10 is a flowchart illustrating a line-interval correction process.

First, in S70 in FIG. 10, the CPU 40 provides a data for forming the third detection pattern P3 stored in the NVRAM 43 to the image forming units 20 and controls the image forming units 20 to start the operation to form the third detection patterns P3 on the belt 13. Then, in S80, using a predetermined capture start time point as the basis, the CPU 40 starts to capture the binary signal S2 from the pattern sensor 15. Furthermore, the CPU 40 detects the positions of the marks 63 on a basis of the rise edges and the fall edges of the pulse waves of the binary signal S2.

Figure 9:
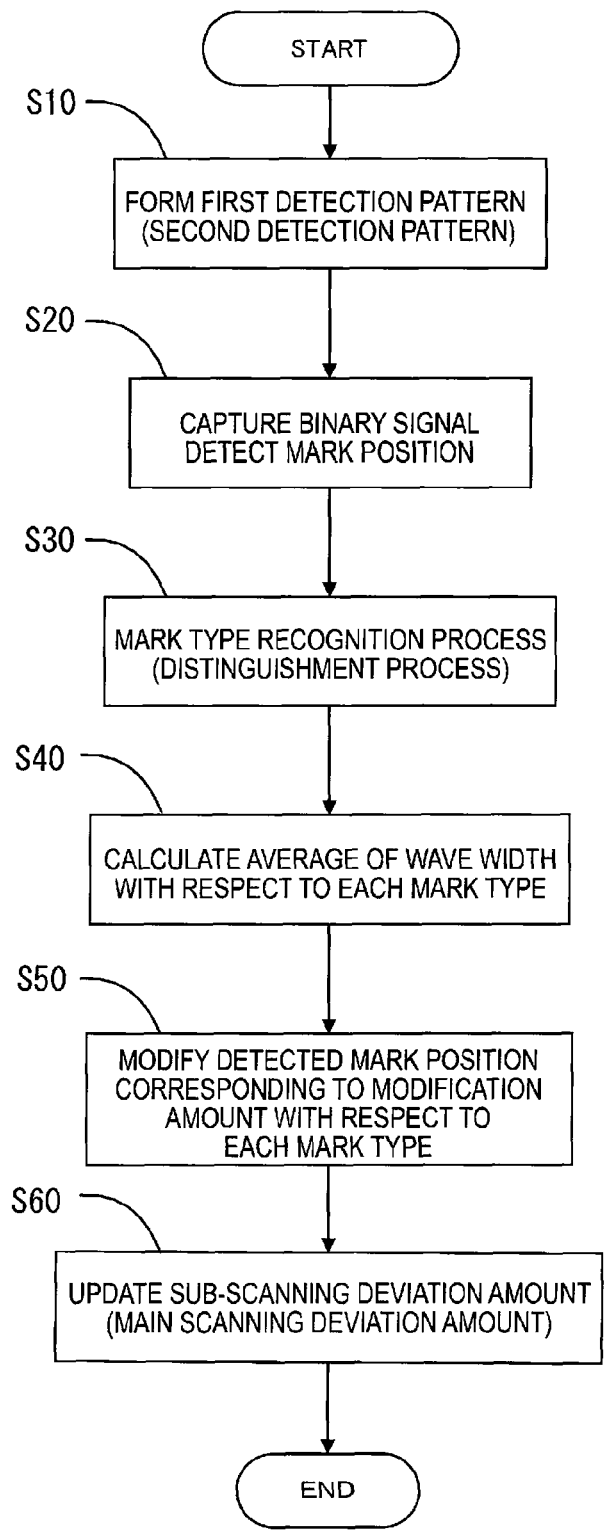
FIG. 9 is a flowchart illustrating a color-deviation correction process.

In S90, on a basis of the binary signal S2 similarly to in S30 in FIG. 9, the CPU 40 recognizes which mark type the marks 63 corresponding to the pulse waves (the signal waves of the light reception signal S1) belong to. Note here that, in this line-interval correction process, the process goes to S100 without calculating the averages of the wave widths of the entire marks 63 with respect to each mark type (S40 in FIG. 9). This is because, in the line-interval correction process, it is indispensable to grasp separately each mark position, and the error between the detected position and the actual position should be grasped separately with respect to each mark. Note that the modification amount may be changed by, for example, with respect to each mark position, calculating the average of the wave widths with respect to a predetermined number of marks including the marks adjacent to the mark and changing the modification amount corresponding to the average value.

In S100, the CPU 40 calculates, with respect to each of the marks 63 of each mark type, the modification amount for modifying the error in the detected positions of the marks 63 detected in S80 and the actual positions. Specifically, the CPU 40, with respect to each mark type, extracts the proportionality coefficient α corresponding to the mark type from the correspondence relation table between the mark types and the proportionality coefficients. Then, the CPU 40, with respect to each of the marks 63 belonging to the same mark type, calculates the modification amount by multiplying the proportionality coefficient α by the wave width of the mark. Then, the detected position of each mark 63 is modified substantially to the actual position with the separate modification amount.

In S110, the CPU 40 calculates the line deviation amount with respect to each of the modified detected position of the marks 63, updates the storage content in the NVRAM 43 by rewriting, and terminates the present correction process. With this, the errors between the detected positions of the marks 63 and the respective actual positions can be reduced, and the line interval correction can be performed with higher accuracy. The CPU 40 functions as a "second correcting unit" then.

(Effects of Illustrative Aspect)

(1) Where the waveforms of the signal waves corresponding to the marks differ, the error amounts between the detected mark positions and the respective actual positions correspondingly differ. Accordingly, in this illustrative aspect, the error between the detected position and the actual mark position can be reduced by modifying the detected mark positions with the modification amounts corresponding to the difference in the waveforms of the signal waves corresponding to the marks.

Here, there is a known art to form the amount of attached toner (the toner density) on the marks with increasing stepwisely from the two ends to the middle direction in the sub-scanning direction so as to compensate the difference in the waveforms of the signal waves of the marks. However, with this art, the density has to be adjusted by mark, and it cannot be conceivable that it is suitable in view of control burden. As opposed to this, with this illustrative aspect, the errors between the detected mark positions and the actual positions can be reduced by the means other than that of the art without requiring the density adjustment.

Furthermore, with the known art, the density of the marks has to be adjusted in accordance with designed values. However, such density adjustment is difficult in practice as described above, and there is a risk of failure in effective reduction of the errors between the detected mark positions and the actual positions after all. Therefore, by adopting this illustrative aspect in addition to the configuration of the known art, the influence of the errors in density can be reduced, and the errors between the detected mark positions of and the actual positions can be effectively reduced.

(2) It is conceivable that the difference in the waveforms that causes the errors between the detected mark positions and the actual positions is greatly influenced specifically by the difference in color, shape, and size of the marks. Therefore, with this illustrative aspect, the difference in the waveforms can be determined by the comparatively simpler manner, that is, by, on a basis of the information on the process of forming the marks, recognizing which mark the signal waves contained in the light reception signal S1 correspond to.

<Other Illustrative Aspects>

The present invention is not limited to the illustrative aspect above described with reference to the drawings; various illustrative aspects such as follows are also included within the scope of the present invention:

(1) In the above-described illustrative aspect, the mark positions are detected as the positions corresponding to the center time points between two time points crossing the mark detection threshold VM. The "detecting unit" according to the present invention is not limited to this. The mark positions may be positions corresponding to another intermediate time points other then the center time points. Furthermore, the configuration may be such that the positions corresponding to time points where the signal waves of the light reception signal S1 reach the peak values are determined as the mark positions. In this configuration, the difference in the waveforms of the signal waves should be determined on a basis of the wave height values of the signal waves.

(2) The above-described illustrative aspect is configured such that the difference in the waveforms of the signal waves (change of the modification amount) is determined on the basis of the wave widths of the signal waves. The "modifying unit" according to the present invention is not limited to this. For example, it may be such that the light reception signal S1 is A/D converted, the waveforms themselves of the signal waves are captured by the CPU 40, and the difference in the waveforms themselves are determined at the CPU 40.

If the configuration is such that the CPU 40 can capture the signal waveforms of the light reception signal S1 as they are, the difference in the slopes of the signal waves (for example, the difference in the light reception signal levels before and after the signal waves cross the mark detection threshold VM) may be directly determined. Furthermore, as understood from FIG. 7, the slopes of the signal waves have a correlation also with the wave height values of the signal waves. Accordingly, the difference in the waveforms of the signal waves may be determined on a basis of the wave height values of the signal waves. Furthermore, the difference in the waveforms may be determined on a basis of two or more of the slopes, the wave widths, and the wave height values of the signal waves. For example, the configuration may be such that the differences in the waveforms are determined corresponding to a combination pattern between the difference in the slopes or the wave widths of the signal waves and the difference in the wave height values.

(3) The above-illustrative aspect is configured such that the modification amount with respect to each mark type is, further, changed corresponding to the waveform of the signal wave of each mark. The "modifying unit" according to the present invention is not limited to this. The modification amount may be a fixed value with respect to each mark type. Even in such a configuration, the difference in the waveforms is determined, though indirectly, on the basis of the information on the process of forming the marks. Accordingly, this configuration is included within the scope of the present invention.

(4) In the above-described illustrative aspect, the proportionality coefficients between the modification amounts and the wave widths of the signal waves are the fixed values by mark type. The present invention is not limited to this. For example, each of the wave widths (or the slopes or the wave height values) may be divided into a plurality of sections depending on its magnitude so that the proportionality coefficients differ by section. As understood from FIG. 7, the slope of each signal wave changes. Accordingly, in order to change the modification amount more strictly, the wave width of the signal wave should be divided into the plurality of sections, and a smaller proportionality coefficient α should be used for the section having a smaller wave width (a proportional relation which slope is lower).

Furthermore, differently from the above-described illustrative aspect, the configuration may be such that no proportionality coefficient is used. For example, the configuration may be such that a correspondence relation table between 'the wave widths of the signal waves' and 'modification amounts that correspond to actual measurements of the detected mark positions and the actual positions' are stored in the NVRAM 43, and the modification amounts for the detected mark positions are extracted from the correspondence relation table.

(5) In the above-described illustrative aspect, the modification amounts (the proportionality coefficients α) may be changed corresponding to the temperature in the casing 2. Particularly, with the configuration as of the above-described illustrative aspect wherein the light reception signal S1 is outputted via the low-pass filter 60, the change in the error amounts between the detected mark positions and the actual positions is greatly influenced specifically by the time constant of the low-pass filter 60. Then, the time constant fluctuates depending on the environmental temperature. Accordingly, as illustrated by the dotted line in FIG. 2, a temperature sensor 47 (configured by, for example, a thermistor) for sending a measurement signal corresponding to the temperature in the casing 2 to the CPU 40 should be provided so that the proportionality coefficients α can be changed on a basis of the time constant of the low-pass filter 60 and the temperature detected by the temperature sensor 47. With the above-described illustrative aspect, the proportionality coefficients α are decreased corresponding to increase in the detected temperature.

(6) In the above-described illustrative aspect, the marks that differ in color are determined to differ in the mark types. The "recognizing unit" of the present invention is not limited to this. For example, the waveforms of the signal waves in the yellow, magenta, and cyan (chromatic) colors closely resemble each other than the waveform of the signal waves in the black (achromatic) color. Accordingly, the configuration may be such that the marks that are same in shape and size and which color is chromatic are determined to belong to a same mark type, and the proportionality coefficient is standardized.

(7) In the above-described illustrative aspect, the color printer is described as an illustration. The "image forming apparatus" of the present invention is not limited to this. The apparatus may be a printer (for example, a monochromatic printer) that forms only monochromatic images. Furthermore, the apparatus may be an electrophotographic printer of any type that utilizes a light emitting element, laser light source, etc. other than LEDs, or may be an inkjet printer.

(8) The apparatus described in the above illustrative aspect is an image forming apparatus of a so-called direct transfer type that detects the mark positions by forming the marks on the belt 13 for conveying the sheets 3. The "carrier" of the present invention is not limited to this. For example, in an image forming apparatus of an intermediate transfer type, the mark may be formed on an intermediate transfer belt using the forming units.

What is claimed is:

1. An image forming apparatus comprising:
a forming unit configured to form a mark on a carrier and including a plurality of forming units, each forming unit configured to form respective marks in respective colors different from each other;
a light emitting unit configured to emit light toward a surface of the carrier;

a light receiving unit configured to receive reflected light from the surface of the carrier and from the mark and to output a light reception signal corresponding to an amount of the received reflected light;

a processor; and memory storing computer readable instructions that, when executed, cause the image forming apparatus to:

detect a position of the mark on the carrier based on a signal wave included in the light reception signal;

modify the detected position of the mark by a modification amount corresponding to a difference in a waveform of the signal wave corresponding to the mark so as to reduce an error between the detected position and an actual position;

recognize which mark the signal wave included in the light reception signal corresponds to based on information on a process of forming the marks by the forming unit; and determine the difference in the waveform of the signal wave based on the color, shape, and size of the mark corresponding to the signal wave.

2. The apparatus according to claim 1, wherein determining the difference in the waveform is further performed based on at least one of a slope, a wave width, and a wave height value of the signal wave.

3. The apparatus according to claim 1, wherein:

the plurality of forming units include a forming unit configured to form a mark in a chromatic color and a forming unit configured to form a mark in an achromatic color; and the computer readable instructions, when executed, further cause the image forming apparatus to:

distinguish whether the signal wave corresponds to the mark in the chromatic color or to the mark in the achromatic color based on at least one of a slope, a wave width, and a wave height value of the signal wave of the light reception signal; and recognize which mark the signal wave corresponds to based on, in addition to information on the forming process, a result of the distinguishing.

4. The apparatus according to claim 1, wherein, with respect to each of one or more other signal waves of a plurality of signal waves which have been determined to be of a same mark type, the image forming apparatus is further caused to change a modification amount corresponding to at least one of a slope, a wave width, and a wave height value of each of the one or more other signal waves.

5. The apparatus according to claim 1, wherein the computer readable instructions, when executed, further cause the image forming apparatus to:

perform a color-deviation correction process based on detected positions of a plurality of marks formed by two forming units different from each other, wherein the color-deviation correction process includes correcting relative positions between the detected positions of the plurality of marks formed by the two forming units; and modify the detected position by a modification amount corresponding to an average at least one of a slope, a wave width, and a wave height value, at a time of execution of the color-deviation correction process, with respect to each of one or more other signal waves of a plurality of signal waves which have been recognized to be of a same mark type.

6. The apparatus according to claim 1, wherein the computer readable instructions, when executed, further cause the image forming apparatus to:

perform a line-interval correction process based on detected positions of a plurality of marks which have been formed by a same one of the plurality of forming units, wherein the line-interval correction process includes correcting relative positions between the detected positions of the plurality of marks formed by the same one of the plurality of forming units, individually modify a modification amount corresponding to the difference in at least one of a slope, a wave width, and a wave height value, at the time of execution of the line-interval correction process, with respect to signal waves that have been recognized to be of a same mark type.

7. The apparatus according to claim 1 further comprising:

a low-pass filter configured to receive the light reception signal from the light receiving unit and to output the noise reduced light reception signal; and a temperature sensor configured to detect a temperature in the apparatus, wherein the image forming apparatus is further caused to modify the modification amount based on the temperature detected by the temperature sensor.

8. An image forming apparatus comprising:

a forming unit configured to form a mark on a carrier;

a light emitting unit configured to emit light toward a surface of the carrier;

a light receiving unit configured to receive reflected light from the surface of the carrier and from the mark and to output a light reception signal corresponding to an amount of the received reflected light;

a low-pass filter configured to receive the light reception signal from the light receiving unit and to output the noise reduced light reception signal;

a temperature sensor configured to detect a temperature in the apparatus;

a processor; and memory storing computer readable instructions that, when executed, cause the image forming apparatus to:

detect a position of the mark on the carrier based on a signal wave included in the light reception signal;

modify the detected position of the mark by a modification amount corresponding to a difference in a waveform of the signal wave corresponding to the mark so as to reduce an error between the detected position and an actual position; and modify the modification amount based on the temperature detected by the temperature sensor.

9. An image forming apparatus comprising:

a forming unit configured to form a mark on a carrier;

a light emitting unit configured to emit light toward a surface of the carrier;

a light receiving unit configured to receive reflected light from the surface of the carrier and from the mark and to output a light reception signal corresponding to an amount of the received reflected light;

a processor; and memory storing computer readable instructions that, when executed, cause the image forming apparatus to:

detect a position of the mark on the carrier based on a signal wave included in the light reception signal; and modify the detected position of the mark by a modification amount corresponding to a difference in a wave width of the signal wave corresponding to the mark so as to reduce an error between the detected position and an actual position, wherein the wave width of the signal wave is a time difference between two time points where the signal wave crosses a mark detection threshold.

10. The apparatus according to claim 9, wherein:
the forming unit includes a plurality of forming units, each of the forming units configured to form respective marks in respective colors different from each other;
wherein the computer readable instructions, when executed, further cause the image forming apparatus to:
recognize which mark the signal wave included in the light reception signal corresponds to based on information on a process of forming the marks by the forming unit; and
determine the difference in the waveform of the signal wave based on a color, shape, and size of the mark corresponding to the signal wave.

11. The apparatus according to claim 10, wherein:
the plurality of forming units include a forming unit configured to form a mark in a chromatic color and a forming unit configured to form a mark in an achromatic color;
the computer readable instructions, when executed, further cause the image forming apparatus to:
distinguish whether the signal wave corresponds to the mark in the chromatic color or to the mark in the achromatic color based on at least one of a slope, a wave width, and a wave height value of the signal wave of the light reception signal; and
recognize which mark the signal wave corresponds to based on, in addition to information on the forming process, a result of the distinguishing.

12. The apparatus according to claim 10, wherein, with respect to each of one or more other signal waves of a plurality of signal waves which have been determined to be of a same mark type, the image forming apparatus is further caused to change a modification amount corresponding to at least one of a slope, a wave width, and a wave height value of each of the one or more other signal waves.

13. The apparatus according to claim 10, wherein the computer readable instructions, when executed, further cause the image forming apparatus to:
perform a color-deviation correction process based on detected positions of a plurality of marks formed by two forming units different from each other, wherein the color-deviation correction process includes correcting relative positions between the detected positions of the plurality of marks formed by the two forming units; and
modify the detected position by a modification amount corresponding to an average at least one of a slope, a wave width, and a wave height value, at a time of execution of the color-deviation correction process, with respect to each of one or more other signal waves of a plurality of signal waves which have been recognized to be of a same mark type.

14. The apparatus according to claim 10, wherein the computer readable instructions, when executed, further cause the image forming apparatus to:
perform a line-interval correction process based on detected positions of a plurality of marks which have been formed by a same one of the plurality of forming units, wherein the line-interval correction process includes correcting relative positions between the detected positions of the plurality of marks formed by the same one of the plurality of forming units; and
individually modify a modification amount corresponding to the difference in at least one of a slope, a wave width, and a wave height value, at the time of execution of the line-interval correction process, with respect to the signal waves that have been recognized to be of a same mark type.

15. The apparatus according to claim 9, further comprising:
a low-pass filter configured to receive the light reception signal from the light receiving unit and to output the noise reduced light reception signal toward the detecting unit; and
a temperature sensor configured to detect a temperature in the apparatus,
wherein the image forming apparatus is further caused to modify the modification amount based on the temperature detected by the temperature sensor.

* * * * *